J. LAMONT, Dec'd.
Assignor to J. & A. LAMONT.
Razor-Strop.
No. 8,181. Reissued April 16, 1878.
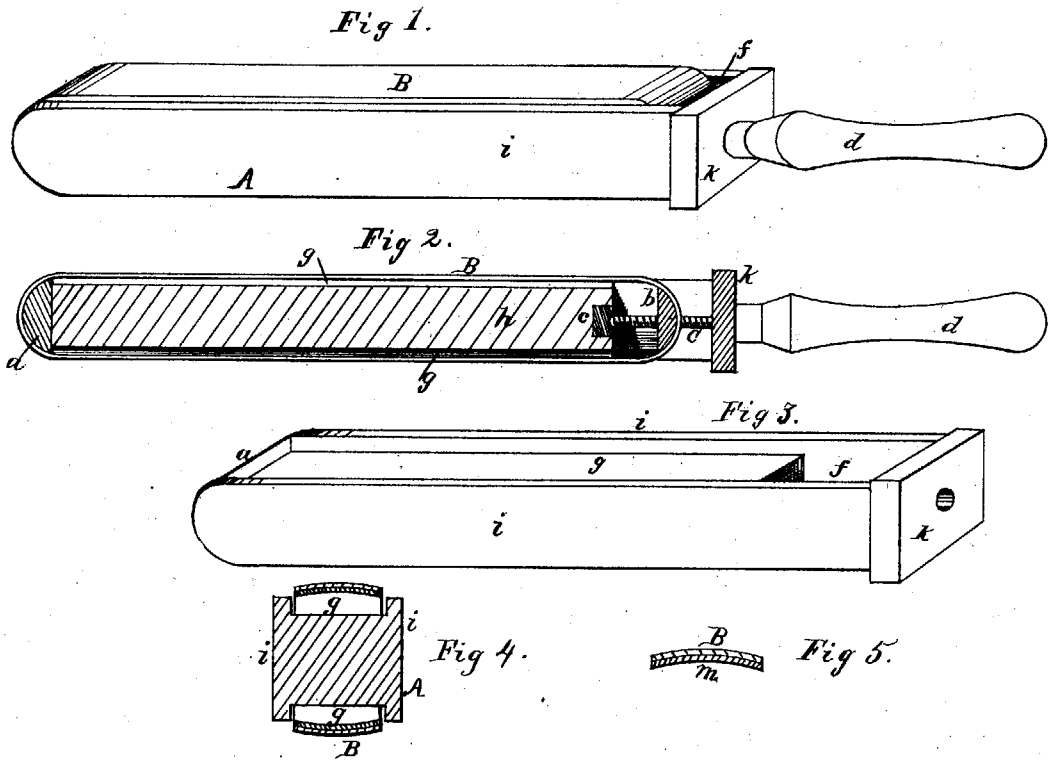
*Witnesses:*
*Thomas L. Turner*
*John Mitchell*
*Inventor:*
*John Lamont & Alex. Lamont*
*assrs of James Lamont, dec'd.*
*per Frank H. Clement*
*Atty.*
N. PETERS, PHOTO-LITHOGRAPHER, WASHINGTON, D. C.

UNITED STATES PATENT OFFICE.

JOHN LAMONT AND ALEXANDER LAMONT, OF ROCHESTER, NEW YORK, ASSIGNEES OF JAMES LAMONT, DECEASED.

IMPROVEMENT IN RAZOR-STROPS.

Specification forming part of Letters Patent No. 173,477, dated February 15, 1876; Reissue No. 8,181, dated April 16, 1878; application filed February 13, 1878.

*To all whom it may concern:*

Be it known that I, JAMES LAMONT, of the city of Rochester, in the county of Monroe and State of New York, have invented a certain new and useful Improvement in Razor-Strops; and I do hereby declare that the following is a full, clear, and exact description of the construction and operation of the same, reference being had to the accompanying drawings, in which—

Figure 1 is a perspective view of the instrument. Fig. 2 is a longitudinal vertical section. Fig. 3 is a perspective view of the stock with the fixtures removed therefrom. Fig. 4 is a cross-section of the strop. Fig. 5 is a cross-section of one side of the combined leather and wood strap.

My improvement relates to those devices which have an endless leather strap tightened or straightened by a screw. This form of the instrument is well known, and is superior to the old style of strop, in which the sharpening-surfaces are applied on the four sides of a solid wooden block. But in all devices of the improved kind with which I am acquainted the endless strap is used alone. No hone is employed, such as is combined with the old-style four-sided block, thus leaving the instrument incomplete. In all the improved kinds, also, so far as I am aware, a simple rod-connection extends longitudinally through between the sizes of the strap, and its only use is to produce the necessary expansion of the leather.

It is the object of my invention to combine with such a strop a hone, to make the instrument more complete and perfect; and the invention consists, essentially, in the construction of the wooden block to which the strap is attached, by which this result is accomplished.

A represents the wooden block which forms the stock. B is the endless strap, attached fast to the outer end *a* of the block, and connected at the opposite end to a movable bearing, *b*, which forms a nut. C is the screw, resting loosely against a stop, *c*, and passing through the bearing *b*, being secured at the outer end fast to an independent handle, *d*. By turning the handle it will be seen that the strap will be strained or tightened in condition for use.

The block A is of peculiar construction. The front end, or that next the handle, has an opening, *f*, cut through vertically, to allow the passage of the strap. In the rear of this both vertical sides, forming the top and bottom, may be grooved out to form channels *g g*. The width of these channels can be a little greater than that of the endless strap, and their depth such as to allow the strap to sink therein, so that its surface projects but little above the top of the block. By this means the square form of the instrument is preserved, enabling it to fit a square cover or case, and also these channels allow the vertical play of the strap under action, to obtain the proper elasticity in sharpening the razor. The inner end of the central part *h* forms the seat for the stop *c*, as before described. The two sides *i i* of the block, at right angles to the strap, are made smooth and wide their whole extent, and are covered with emery of different grades to form the hones. The inner end of the block has a head, *k*, through which the screw passes loosely, and which forms the fulcrum for the handle.

By the means above described I combine with the strap B two hone-sides corresponding with those used in the old-style solid strop, thereby gaining all the advantages of a hone with a straining-strap, which, so far as I am aware, has never before been done. In addition to this, by means of the channels *g g*, I combine the whole in square form in cross-section, and provide seats for the strap to rest in, with space beneath the strap for the vertical play of the same, by which the latter preserves its elasticity under action. These channels also retain the strap against lateral displacement by confining it between their sides.

Heretofore, so far as I am aware, only a rod has run between the lengths of leather for the purpose of straining the same, and no provision has been made to retain the strap against the lateral action of drawing the razor across, and no hone has been employed with such a strap, as in my device.

I apply on the inner side of each of the lengths of the strap a thin strip of wood, *m*, which is glued fast thereto, and extends from end to end. In gluing, the strip is compressed transversely and the leather is stretched over it, so that when in place it gives a convex surface in cross-section to the leather on top, as shown in Fig. 5. It is also so bent as to give a swell or curve upward to the strap in the longitudinal direction. In this form the strap is in best condition for sharpening the razor, and danger of cutting the strap is diminished. Elm is the best wood for this purpose, as it is perfectly pliable in its application, and when once secured fast in place retains this curved form without trouble. It is cheaper and more elastic than either a metallic or paper base, which have heretofore been used, and it also gives more body than either of the latter, without increasing weight.

Having thus described my invention, I do not claim, broadly, an endless strap strained by a screw; neither do I claim a non-extensible base of metal, paper, or wood for the strap; but

I claim—

1. A rectangular block provided with opening *f*, hone-surfaces *i i*, block *k*, handle *d*, screw C, nut *b*, and screw-stop *c* inserted in the end of block *h*, in combination with the continuous strap B, substantially as and for the purpose specified.

2. The stock A. constructed with hone-sides *i i*, opening *f*, and channels *g g*, in combination with strap B, screw C, handle *d*, and nut *b*, substantially as and for the purpose specified.

JOHN LAMONT,
ALEX. LAMONT,
*Assignees of James Lamont, deceased.*

Witnesses:
EDWARD BARNES,
H. O. HALL.